United States Patent [19]

Smith et al.

[11] 4,228,208
[45] Oct. 14, 1980

[54] COMPOSITE MATERIAL OF FACING LAYER AND PILE KEY FABRIC

[75] Inventors: Michael D. Smith, Rugby; Eric K. L. Mason, Colchester; Robert J. Morley, Spondon, nr. Derby, all of England

[73] Assignee: Courtaulds Limited, London, England

[21] Appl. No.: 919,952

[22] Filed: Jun. 28, 1978

[30] Foreign Application Priority Data

Jul. 7, 1977 [GB] United Kingdom ............... 28497/77
Nov. 3, 1977 [GB] United Kingdom ............... 45727/77

[51] Int. Cl.² ............................................. B32B 33/00
[52] U.S. Cl. ....................................... 428/95; 428/85; 428/86; 428/92; 428/96; 428/97
[58] Field of Search ....................... 428/86, 92, 95, 96, 428/97, 85

[56] References Cited

U.S. PATENT DOCUMENTS

3,881,972  5/1975  Long ..................................... 428/86

FOREIGN PATENT DOCUMENTS

1052949  12/1966  United Kingdom .

*Primary Examiner*—Marion McCamish
*Attorney, Agent, or Firm*—Davis, Hoxie, Faithfull & Hapgood

[57] ABSTRACT

A facing or lining material of a thermoplastic such as polypropylene is provided with a key fabric bonded to its reverse face so that a reinforcing material such as fibre-reinforced resin or hydraulic cement can be bonded to it. The key fabric is a pile fabric made for example by tufting, and the pile fibres can be embedded in the reinforcement material to provide a strong bond. Glass fibres are suitable for the pile and are made of alkali-resistant glass for use with cement reinforcement. The composite material can be used for lining vessels, tanks, ducts and pipes in chemical plant and as an external or internal facing material for buildings.

14 Claims, No Drawings

COMPOSITE MATERIAL OF FACING LAYER AND PILE KEY FABRIC

This invention relates to a composite facing or lining material (hereinafter referred to generally as a facing material) which is adapted for bonding to a reinforcing material.

British Pat. Specification No. 1,052,949 describes such a facing material which comprises a thermoplastics sheet, particularly polypropylene, bonded to a woven or knitted fabric comprising glass fibres and thermoplastics fibres. The latter provide good adhesion to the sheet and the fabric acts as a "key" to which a bulk reinforcement material such as resin reinforced with glass fibres (G.R.P.) will bond.

One of the main uses for such a material is in the construction of chemical plant where, for example, the polypropylene provides a highly chemically-resistant lining for vessels, tanks and pipes with the "key" fabric giving the necessary adhesion to the G.R.P. reinforcement. Good adhesion is essential to the overall strength of the structure particularly under conditions of vacuum.

According to the invention, a composite facing material adapted for bonding to a reinforcement material comprises a facing layer of a thermoplastic material and a key fabric comprising a base layer bonded on one face to the facing layer and a fibrous pile secured to the base layer and projecting from its reverse face.

The fibrous pile of the key fabric provides a large surface area which is highly receptive to bonding to reinforcing materials such as G.R.P. which are applied in the liquid state and which subsequently cure in situ. The fibres of the pile are preferably both strong and compatible with the reinforcing material to get the best bond strengths, and glass fibres fulfil these criteria with G.R.P. reinforcement, as well as being comparatively inexpensive.

The facing layer may be any thermoplastic material which can be formed into sheet or other shapes such as moulded or extruded pipes or vessels, and which is suitable for the facing duty required. Suitable materials include polyolefins, particularly polypropylene, polycarbonates, polyethers, polyaldehydes, polyvinyls and polystyrene.

The base layer of the key fabric may be made from a thermoplastic material which is the same as, or is compatible with, that of the facing layer to promote bond strength. Whilst an intermediate adhesive material may be used, it is preferred to obtain fusion between the facing layer and the base layer by the use of heat or solvent action. For example, the facing layer may be a sheet of polypropylene which is calendered to a base layer comprising a polypropylene fabric whilst its surface is still soft immediately after extrusion. This technique is described in British Pat. No. 1,052,949.

The base layer may comprise a woven, knitted or non-woven fabric or simply a thermoplastic film. An example of the latter is a sheet of polypropylene or polyethylene film, and an example of a suitable woven fabric is one woven from flat polypropylene tape yarn such as is used for carpet backings. A suitable non-woven fabric is a spun-bonded polypropylene fabric such as the fabric sold under the Registered Trade Mark 'Typar'.

The fibrous pile may be secured to the base layer by any of the known techniques including tufting, pile weaving (terry or plush), sliver knitting, terry knitting, stitch-bonding ("Malipol" machine), and needle punching—obviously, in some of these techniques the base layer is formed at the same time as the pile. Tufting is a favoured technique because it lends itself to the use of glass fibre to form the pile without too much damage to the fibre, and provides a good anchorage of the pile in the base layer, particularly when the base layer is bonded to the facing layer. Also, it is a comparatively inexpensive operation. Additional techniques which may be used to make the pile-bearing key fabric include raising or knapping the surface of a fibrous base fabric to partially withdraw some of the base fabric fibres into an integral fibrous pile.

The invention includes a wall structure comprising a composite facing material bonded to a reinforcement material wherein the composite facing material comprises a facing layer of a thermoplastic material and a key fabric comprising a base layer bonded on one face to the facing layer and a fibrous pile secured to the base layer and projecting from its reverse face, and wherein the fibrous pile of the key fabric is embedded in the reinforcement material.

The reinforcement material may be G.R.P. as mentioned already or indeed any suitable fibre-reinforced resin. Hydraulic cement is another suitable reinforcement material in any of its various forms including Portland cement, high alumina cement, ciment fondu and gypsum plaster, all with or without aggregate or fibrous reinforcement and including 'concrete' products. With cement, the preferred pile fibres comprise alkali-resistant glass ("K" glass), for example as manufactured by Pilkington Bros. Ltd. as "Cemfil" (Registered Trade Mark). Other suitable pile fibres, for both cement and other reinforcement materials, include fibres of polyester or polyamide, including aromatic polyamides such as "Kevlar" (Registered Trade Mark), and acrylic and modacrylic fibres.

The reinforcement material may be applied to the fibrous pile surface of the composite facing material by any of the usual techniques. For example, both G.R.P. and cement may be applied by hand lay-up, by spraying, or by moulding or casting.

The wall structure of the invention may be that of a lined pipe, duct, vessel or tank, or may be the wall of a building having an external facing and/or an internal lining. For example, concrete buildings may be faced with decorative and weather-resistant plastics panels by using the composite material of the invention. Another end use is in the lining of rooms where hygiene is important, such as in hospitals or abbatoirs.

The invention is illustrated by the following examples

EXAMPLES 1–6

In each of the six examples a key fabric was made by tufting glass yarn into a base fabric to form a loop pile. The glass yarn was a 2400 tex K glass roving sold by Pilkington Brothers Limited as "Cemfil", which had been twisted to 40 turns/meter, and the base fabric was a spun-bonded polypropylene fabric of basis weight 136 grams/meter$^2$ sold under the Registered Trade Mark "Typar". The tufting machine used was of 0.615 mm gauge and the stitch length used was 16.8 mm.

The key fabric of Examples 1 and 2 were both tufted to a pile density of 1.9 tufts/cm$^2$, one (Example 1) with the tufting in straight lines and the other (Example 2) with the tufting indexed (by zig-zag needle shogging) to give a more even tuft distribution. In Examples 3 and 4 the pile density was increased to 2.8 tufts/cm² and in Examples 5 and 6 was increased again to 5.6 tufts/cm².

The following procedure was then followed in each of the six examples. The key fabric was bonded to a 3 mm thick sheet of polypropylene extruded at a temperature of 240° C. by passing the freshly-extruded sheet and the key fabric together through a three roll calender with the non-pile side of the key fabric against the soft surface of the sheet. The temperatures of the calender surfaces were:

| | |
|---|---|
| Top roll | 50° C. |
| Centre roll | 75° C. |
| Bottom roll | 90° C. |

The sheet and the fabric were passed together between the nip of the top and centre rolls, partially lapped around the centre roll, passed through the nip of the centre and bottom rolls and then partially lapped around the bottom roll.

The composite facing material so formed was reinforced with G.R.P. by applying resin and "E" glass in the form of chopped strand mat to the exposed pile surface to a depth of 4.5 mm. The resin was a polyester resin formulation sold by Scott Bader under the trade mark "Crystic" 100. After curing the resin, the bond strength between the key fabric and the G.R.P. reinforcement was measured in shear and in peel using a Hounsfield tensiometer. The peel test was carried out by peeling the polypropylene sheet/key fabric away from the G.R.P. layer at an angle of 90° to the plane of the composite material.

The test results and the basis weights of the key fabrics are shown in the following Table A:

TABLE A

| Ex. | Tuft Density (Tufts/cm²) | Basis Wt. of Key Fabric (gm/m²) | Composite Peel Strength (Kg/cm) | | Composite Shear Strength (Kg/cm²) |
|---|---|---|---|---|---|
| | | | Initiation | Steady | |
| 1 | 1.9 (straight) | 509 | 2.1 | 2.1 | 26.2 |
| 2 | 1.9 (indexed) | 509 | 1.9 | 1.8 | 21.0 |
| 3 | 2.8 (straight) | 695 | 4.5 | 4.5 | 31.5 |
| 4 | 2.8 (indexed) | 695 | 4.5 | 4.3 | 28.9 |
| 5 | 5.6 (straight) | 1254 | 4.6 | 3.9 | 44.5 |
| 6 | 5.6 (indexed) | 1254 | 6.3 | 6.1 | 42.0 |

EXAMPLES 7-12

Key fabrics were made as described in relation to Examples 1-6 with tuft densities and patterns as indicated in the following Table B.

Each sample of key fabric was bonded to a 3 mm thick sheet of polypropylene as described in Examples 1-6 to form composite facing materials. These facing materials were reinforced with a hydraulic Portland cement mixture which was applied by hand to the exposed pile surface to a depth of 32 mm. The cement mixture was allowed to harden and to dry and then the bond strength between the key fabric and the cement reinforcement was measured in shear and in peel according to the same procedure carried out in Examples 1-6.

The test results and the basis weights of the key fabrics are shown in the following Table B:

TABLE B

| Ex. | Tuft Density (Tufts/cm²) | Basis Wt. of Key Fabric (gm/m²) | Composite Peel Strength (Kg/cm) | | Composite Shear Strength (Kg/cm²) |
|---|---|---|---|---|---|
| | | | Initiation | Steady | |
| 7 | 1.9 (straight) | 509 | — | 4.8 | 31.5 |
| 8 | 1.9 (indexed) | 509 | 8.0 | 3.6 | 60.0 |
| 9 | 2.8 (straight) | 695 | 11.1 | 5.7 | 67.5 |
| 10 | 2.8 (indexed) | 695 | 8.4 | 5.5 | 63.0 |
| 11 | 5.6 (straight) | 1254 | 10.7 | 7.5 | 42.5 |
| 12 | 5.6 (indexed) | 1254 | 10.4 | 3.2 | 59.0 |

EXAMPLES 13 and 14

In both examples a key fabric was made by tufting a nylon 6 carpet yarn into a base fabric to form a loop pile. The nylon 6 yarn was a 100 filament 2000 decitex yarn sold under the Registered Trade Mark "Celon"; and the base fabric was a spun-bonded polypropylene fabric of basis weight 136 grams/m² sold under the Registered Trade Mark "Typar". The machine used was of gauge 2.0 mm and the stitch length used was 16 mm.

The key fabric of Example 14 was tufted to a pile density of 12.9 tufts/cm², with the tufting in straight lines, and each needle tufting. The key fabric of Example 13 was tufted to an average pile density of 6.5 tufts/cm² with the tufting in straight lines and sets of three needles tufting alternating with sets of three needles not tufting. These key fabrics were then bonded to a 3 mm thick sheet of polypropylene to form composite facing materials as described in Examples 1-6. The composite facing materials so formed were reinforced with G.R.P. also as described in Examples 1-6.

The bond strengths between the key fabrics and the cured G.R.P. reinforced were measured in shear and in peel both in the machine direction of the tufted fabric and in the transverse direction.

The test results and the basis weights of the key fabrics are shown in the following Table C:

TABLE C

| Ex. | Tuft Density (Tufts/cm²) | Basis Wt. of Key Fabric (gm/m²) | Composite Peel Strength (Kg/cm) (steady) | | Composite Shear Strength (Kg/cm²) | |
|---|---|---|---|---|---|---|
| | | | Machine Direction | Transverse | Machine Direction | Transverse |
| 13 | 6.5 | 351 | 6.7 | 5.7 | 56.0 | 66.0 |
| 14 | 12.9 | 567 | 9.5 | 8.8 | 82.0 | 83.0 |

What is claimed is:

1. A composite facing material adapted for bonding to a reinforcement material and comprising a facing layer of a thermoplastic material difficult to bond to the reinforcement material and a key fabric comprising a base layer bonded on one face to the facing layer and a fibrous pile secured to the base layer and projecting from its reverse face for embedding in the reinforcement material.

2. A composite facing material as claimed in claim 1 in which the facing layer is fused to the base layer of the key fabric.

3. A composite facing material as claimed in claim 1 in which the base layer of the key fabric is selected from materials comprising woven, knitted and non-woven fabrics and thermoplastic film.

4. A composite facing material as claimed in claim 1 in which the fibrous pile of the key fabric has been secured to the base layer of the key fabric by a technique selected from those comprising tufting, pile weaving, sliver knitting, terry knitting, stitch bonding and needle punching.

5. A composite facing material as claimed in claim 1 in which the fibrous pile of the key fabric comprises fibres selected from the group comprising glass fibres, polyamide fibres, polyester fibres, acrylic fibres and modacrylic fibres.

6. A composite facing material as claimed in claim 5 in which the fibrous pile of the key fabric comprises fibres of alkali-resistant glass.

7. A composite facing material as claimed in claim 1 in which the facing layer is a polyolefin material.

8. A wall structure comprising a composite facing material bonded to a reinforcement material wherein the composite facing material comprises a facing layer of a thermoplastic material difficult to bond to the reinforcement material and a key fabric comprising a base layer bonded on one face to the facing layer and a fibrous pile secured to the base layer and projecting from its reverse face, and wherein the fibrous pile of the key fabric is embedded in the reinforcement material.

9. A wall structure as claimed in claim 8 in which the reinforcement material comprises a fibre-reinforced resin.

10. A wall structure as claimed in claim 8 in which the reinforcement material comprises hydraulic cement.

11. A wall structure as claimed in claim 10 in which the fibrous pile of the key fabric comprises fibres of alkali-resistant glass.

12. A wall structure as claimed in claim 8 in which the facing layer of the composite facing material is a polyolefin material.

13. A wall structure as claimed in claim 8 in which the key fabric is a tufted fabric.

14. A wall structure as claimed in claim 8 in which the base layer of the key fabric is a non-woven fabric.

* * * * *